US012640385B2

(12) United States Patent
Park et al.

(10) Patent No.: US 12,640,385 B2
(45) Date of Patent: May 26, 2026

(54) METHOD OF MANUFACTURING ELECTRICITY GENERATING ASSEMBLY

(71) Applicants: HYUNDAI MOTOR COMPANY, Seoul (KR); KIA CORPORATION, Seoul (KR)

(72) Inventors: Kweon Ju Park, Hwaseong-si (KR); Se Joon Im, Seongnam-si (KR); Ju Young Lee, Yongin-si (KR); Min June Choi, Seongnam-si (KR); Kook Il Han, Seongnam-si (KR); Ju Hee Lee, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 786 days.

(21) Appl. No.: 17/983,763

(22) Filed: Nov. 9, 2022

(65) Prior Publication Data

US 2023/0187673 A1     Jun. 15, 2023

(30) Foreign Application Priority Data

Dec. 15, 2021     (KR) ........................ 10-2021-0179360

(51) Int. Cl.
| | |
|---|---|
| *H01M 8/1004* | (2016.01) |
| *H01M 8/0245* | (2016.01) |
| *H01M 8/1226* | (2016.01) |

(52) U.S. Cl.
CPC ....... *H01M 8/1004* (2013.01); *H01M 8/0245* (2013.01); *H01M 8/1226* (2013.01)

(58) Field of Classification Search
CPC ............. H01M 8/1004; H01M 8/0245; H01M 8/1226; H01M 2008/1095; H01M 4/8807; H01M 8/0228; H01M 8/0273; H01M 8/0284; H01M 8/0286; H01M 8/0297; H01M 8/0234; Y02E 60/50; Y02P 70/50
See application file for complete search history.

(56) References Cited

U.S. PATENT DOCUMENTS

| | | | | |
|---|---|---|---|---|
| 5,181,979 A * | 1/1993 | Uemura | ................. | C04B 35/83 264/29.7 |
| 11,207,846 B2 * | 12/2021 | Kim | .................... | H01M 8/0273 |
| 12,132,233 B2 * | 10/2024 | Jang | .................... | H01M 8/0245 |
| 2004/0137303 A1 * | 7/2004 | Kuroki | ................ | H01M 8/0276 429/509 |
| 2011/0318661 A1 * | 12/2011 | Uensal | ................ | H01M 8/0245 429/480 |
| 2013/0247984 A1 * | 9/2013 | Kim | ........................ | B32B 27/18 427/535 |
| 2018/0205087 A1 * | 7/2018 | Ishikawa | ............. | H01M 4/1315 |
| 2020/0044271 A1 * | 2/2020 | Kim | .................... | H01M 8/1067 |
| 2020/0331212 A1 * | 10/2020 | Kim | .................... | H01M 8/1226 |
| 2021/0288337 A1 * | 9/2021 | Jang | .................... | H01M 8/0258 |

FOREIGN PATENT DOCUMENTS

JP     2002-117871 A     4/2002

* cited by examiner

*Primary Examiner* — Muhammad S Siddiquee
(74) *Attorney, Agent, or Firm* — Morgan Lewis & Bockius LLP

(57) ABSTRACT

A membrane electrode assembly and a method of manufacturing an electricity generating assembly include a pair of gas diffusion layers disposed on both surfaces of the membrane electrode assembly. Coupling agents are applied on surfaces of the gas diffusion layers, modifying surfaces of the gas diffusion layers. A coupling agent-friendly adhesive is applied to the surfaces of the gas diffusion layers to which the coupling agents are applied, forming adhesion layers on surfaces of the gas diffusion layers. The gas diffusion layers are stacked on the surfaces of the membrane electrode assembly, causing the adhesion layers to come into contact with the first and second surfaces of the membrane electrode assembly.

19 Claims, 5 Drawing Sheets

METHOD OF MANUFACTURING ELECTRICITY GENERATING ASSEMBLY

CROSS REFERENCE TO RELATED APPLICATION

The present application claims priority to Korean Patent Application No. 10-2021-0179360, filed Dec. 15, 2021, the entire contents of which is incorporated herein for all purposes by this reference.

BACKGROUND OF THE PRESENT DISCLOSURE

Field of the Present Disclosure

The present disclosure relates generally to a method of manufacturing an electricity generating assembly using a coupling agent.

Description of Related Art

Generally, fuel cells are used in a stack type in which fuel cells are stacked and assembled to satisfy a required output level.

The fuel cells are each made up of a membrane electrode assembly (MEA), a gas diffusion layer (GDL), a gasket, and a separator. The GDL and the gasket are stacked at an external portion of the MEA, i.e., a portion where electrodes are located. The MEA is made up of an electrolyte membrane and electrodes. The separator is provided with channels through which cooling water and a reaction gas flow. The reaction gas is supplied to the GDL, in which hydrogen is used as a fuel, and oxygen or air is used as an oxidant.

An electrochemical reaction for electricity production of the fuel cell occurs at the MEA.

Among the components of the fuel cell, the GDL and the MEA are called an electricity generating assembly (EGA). In other words, the EGA of the fuel cell is made up of the GDL and the MEA. After a reaction gas diffused through the GDL is transmitted to the MEA, an electrochemical reaction occurs.

Meanwhile, so far it has been difficult to directly bond the GDL and the MEA, and thus sub-gaskets of the MEA and the GDL are bonded.

Furthermore, the MEA has a problem in which, when the reaction gas is introduced through a gas channel portion of the separator, degradation occurs continuously at regions adjacent to an inlet and an outlet of the gas channel portion.

Referring to FIG. 9, when an electricity generating assembly 10 is manufactured, an adhesive is applied to surfaces of gas diffusion layers 11 coming into contact with the sub-gaskets 13, and a membrane electrode assembly 12 is stacked between the pair of gas diffusion layers 11 in the state in that it comes into physical contact with the sub-gaskets 13 bonded to the gas diffusion layers 11.

However, as described above, when the electricity generating assembly is manufactured, there is a problem in that a bonding force is insufficient between the GDL and the MEA, and thus the MEA is damaged in an environment in which a flow rate of the reaction gas is excessive.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of manufacturing an electricity generating assembly to secure and increase a bonding force between a gas diffusion layer and a membrane electrode assembly.

The objective of the present disclosure is not limited to the aforementioned description, and other objectives not explicitly disclosed herein will be clearly understood by a person having ordinary skill in the art from the description provided hereinafter.

In various aspects of the present disclosure, according to an aspect of the present disclosure, there is provided a method of manufacturing an electricity generating assembly that includes a pair of gas diffusion layers (GDLs) that are disposed on surfaces of both of a membrane electrode assembly and a membrane electrode assembly, the method including steps of: applying a coupling agent to a surface of a gas diffusion layer and thereby modifying the surface of the gas diffusion layer; applying an adhesive having affinity for the coupling agent to the surface of the gas diffusion layer to which the coupling agent is applied and thereby forming an adhesion layer on the surface of the gas diffusion layer; and stacking the gas diffusion layer on the surface of the membrane electrode assembly and thereby allowing the adhesion layer to come into contact with the surface of the membrane electrode assembly.

According to the exemplary embodiment of the present disclosure, the gas diffusion layer may be made up of a base and a microporous layer disposed on a surface of the base, and the adhesion layer is formed on a surface of the microporous layer.

Furthermore, the microporous layer may be formed of a carbon composite having a hydroxyl (—OH) group, and the coupling agent is a silane-based coupling agent having a silanol group (Si—OH) and an alkyl group (R).

Furthermore, the membrane electrode assembly may be made up of an electrolyte membrane and a pair of electrodes bonded to both surfaces of the electrolyte membrane, and the gas diffusion layer is bonded to surfaces of the electrodes through the adhesion layer.

Furthermore, the coupling agent-friendly adhesive may be a fluorine-based polymer organic compound having affinity with the alkyl group (R) of the coupling agent and the electrode material of the membrane electrode assembly. The coupling agent-friendly adhesive may be an ionomer.

Furthermore, the coupling agent and the coupling agent-friendly adhesive may be at least coated on an edge portion of the surface of the gas diffusion layer.

Furthermore, according to another exemplary embodiment of the present disclosure, the present disclosure provides a membrane electrode assembly as well as a method of manufacturing an electricity generating assembly that includes a pair of gas diffusion layers disposed on both surfaces of the membrane electrode assembly, the method including steps of: blending a coupling agent with precursor compounds of the gas diffusion layers to produce a composition in which the coupling agent is contained; forming the gas diffusion layer using the composition in which the coupling agent is contained; applying a coupling agent-friendly adhesive to a surface of the gas diffusion layer and thereby forming an adhesion layer on a surface of the gas diffusion layer; and stacking the gas diffusion layer on the surface of the membrane electrode assembly and thereby causing the adhesion layer to come into contact with the surfaces of the membrane electrode assembly.

Meanwhile, according to another exemplary embodiment of the present disclosure, the present disclosure provides a membrane electrode assembly as well as a method of manufacturing an electricity generating assembly that includes a pair of gas diffusion layers disposed on both surfaces of the membrane electrode assembly, the method including: immersing the gas diffusion layer into an organic solvent in which a coupling agent is dispersed and thereby modifying a surface of the gas diffusion layer; applying the coupling agent-friendly adhesive to the surface of the gas diffusion layer and thereby forming an adhesion layer on the surface of the gas diffusion layer; and stacking the gas diffusion layer on the surface of the membrane electrode assembly and thereby causing the adhesion layer to come into contact with the surface of the membrane electrode assembly.

According to the means for resolving the problems, the present disclosure provides the following effects.

First, the bonding force between the gas diffusion layer and the membrane electrode assembly is secured by use of, for example, the coupling agent when manufacturing the electricity generating assembly. Accordingly, it is possible to prevent a phenomenon in which the reaction gas supplied to the electricity generating assembly leaks due to an adhesion failure of the gas diffusion layer and the membrane electrode assembly.

Second, the adhesion layer made up of the coupling agent-friendly adhesive is provided between the gas diffusion layer and the membrane electrode assembly, so that damage to the membrane electrode assembly in an environment in which a flow rate of the reaction gas is excessive may be reduced.

Third, by selectively adding an antioxidant to the coupling agent-friendly adhesive to thereby delay a degradation reaction of the membrane electrode assembly, it is possible to further increase durability of the membrane electrode assembly.

Fourth, because the binder components (i.e., ionomer components) contained in the electrode material of the membrane electrode assembly exist in the coupling agent-friendly adhesive, a flooding phenomenon generated from the electrodes of the membrane electrode assembly may be reduced.

Fifth, the adhesion layer is partly degraded in place of the electrolyte membrane and the electrodes of the membrane electrode assembly, and thereby it is possible to expect an effect in which a lifespan of the membrane electrode assembly is increased.

The effects of the present disclosure are not limited to the aforementioned effects, and other effects not explicitly disclosed herein will be clearly understood by a person including ordinary skill in the art from the description provided hereinafter.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
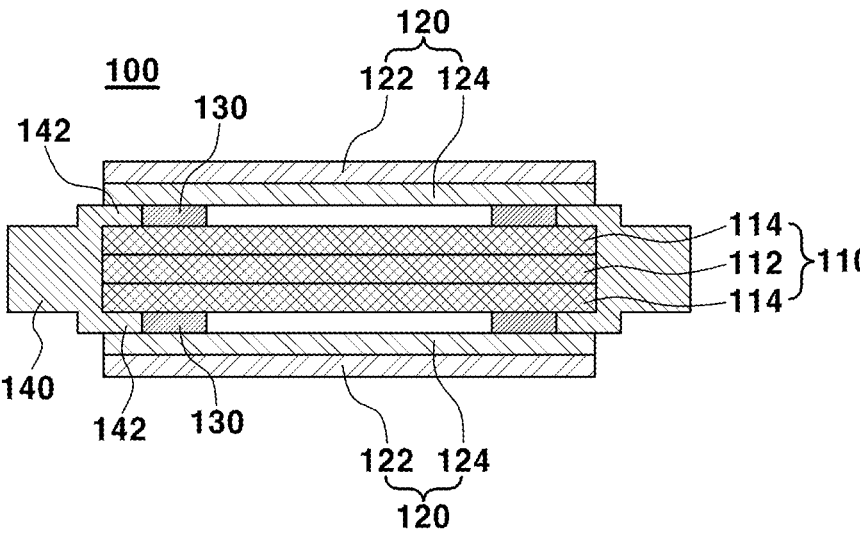
FIG. 1 is a view schematically illustrating an electricity generating assembly produced by a method of manufacturing an electricity generating assembly according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structures and functional descriptions included in embodiments of the present disclosure are merely provided by way of example for purposes of describing embodiments according to the concept of the present disclosure. The exemplary embodiments according to the concept of the present disclosure may be conducted in various forms.

Furthermore, throughout the present specification, when a certain portion "includes" or "comprises" a certain component, this indicates that, unless otherwise disclosed, the other components are not excluded but may be further included or provided.

Furthermore, in the present disclosure, when a certain portion is located "on" or "above" the other portion, this includes not only the case in which the certain portion is located "directly on" the other portion, but also the case in which yet another portion is located in the middle. In addition, when a certain portion is located "under" or "below" another portion, this includes not only the case in which the other portion is located "directly under" the other portion, but also the case in which yet another portion is located in the middle thereof.

Furthermore, in the present disclosure, when a certain portion "comes into contact with" another portion, this includes not only the case in which the certain portion comes into direct contact with the other portion, but also the case in which the certain portion comes into contact with the other portion through yet another portion between them.

Hereinafter, various embodiments of the present disclosure will be described with reference to the accompanying drawings. Contents expressed in the accompanying drawings may be different from forms that are actually embodied by drawings schematized to easily describe the exemplary embodiments of the present disclosure.

The present disclosure relates to a membrane electrode assembly (MEA) and a method of manufacturing an electricity generating assembly (EGA) made up of a pair of gas diffusion layers, and is directed to improve an adhesive force between the gas diffusion layer and the membrane electrode assembly using a coupling agent.

The electricity generating assembly includes a gas diffusion layer of a fuel cell and a membrane electrode assembly. As the coupling agent, a coupling agent capable of an affinity between the gas diffusion layer and the adhesive is used.

As the adhesive, an adhesive having an affinity with the coupling agent is used for bonding between the gas diffusion layer and the membrane electrode assembly. Furthermore, as the adhesive, a compound equal or similar to the binder contained in the electrodes of the membrane electrode assembly is used.

Figure 2:
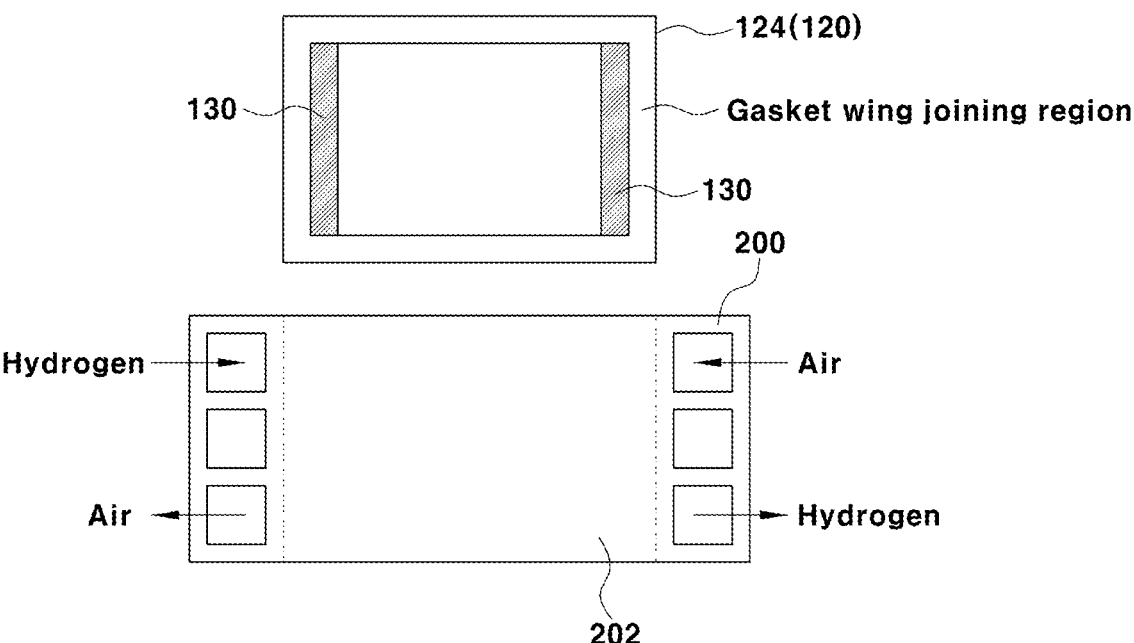
FIG. 2 is a view exemplarily illustrating a gas diffusion layer to which a coupling agent-friendly adhesive is applied by the method of manufacturing an electricity generating assembly according to the exemplary embodiment of the present disclosure.
Figure 3:
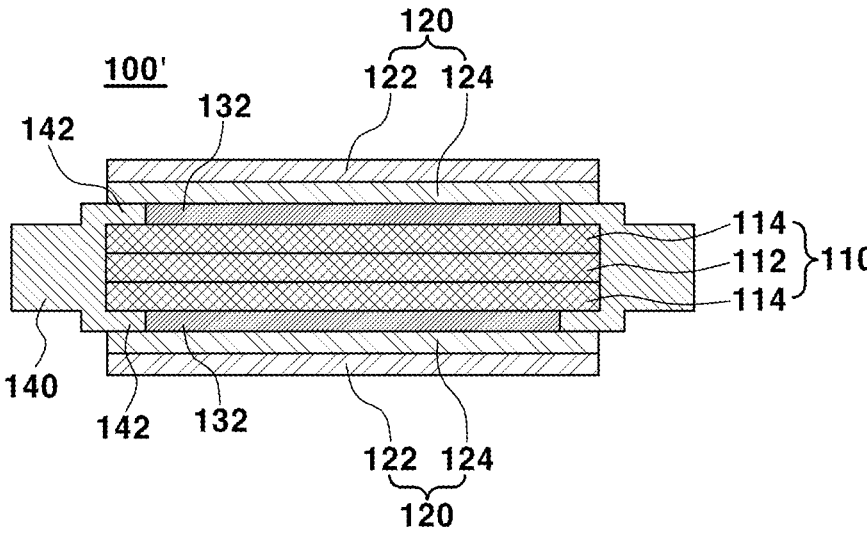
FIG. 3 is a view schematically illustrating an electricity generating assembly produced by a method of manufacturing an electricity generating assembly according to another exemplary embodiment of the present disclosure.
Figure 4:
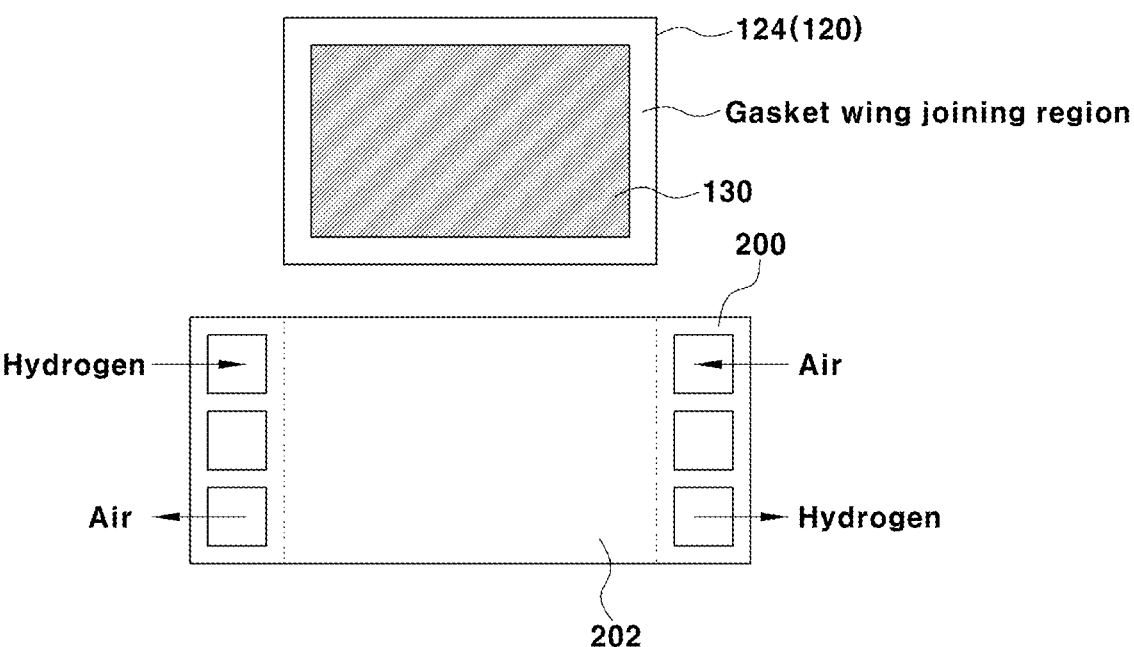
FIG. 4 is a view exemplarily illustrating a gas diffusion layer to which a coupling agent-friendly adhesive is applied by the method of manufacturing an electricity generating assembly according to the other embodiment of the present disclosure.
Figure 5:
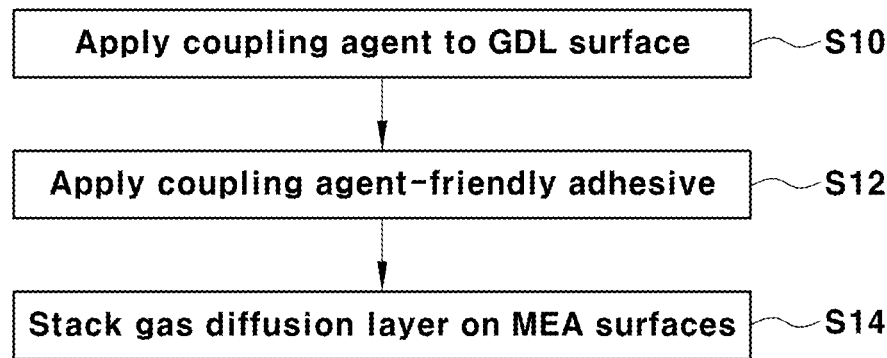
FIG. 5 is a view schematically illustrating a method of manufacturing an electricity generating assembly according to another exemplary embodiment of the present disclosure.
Figure 6:
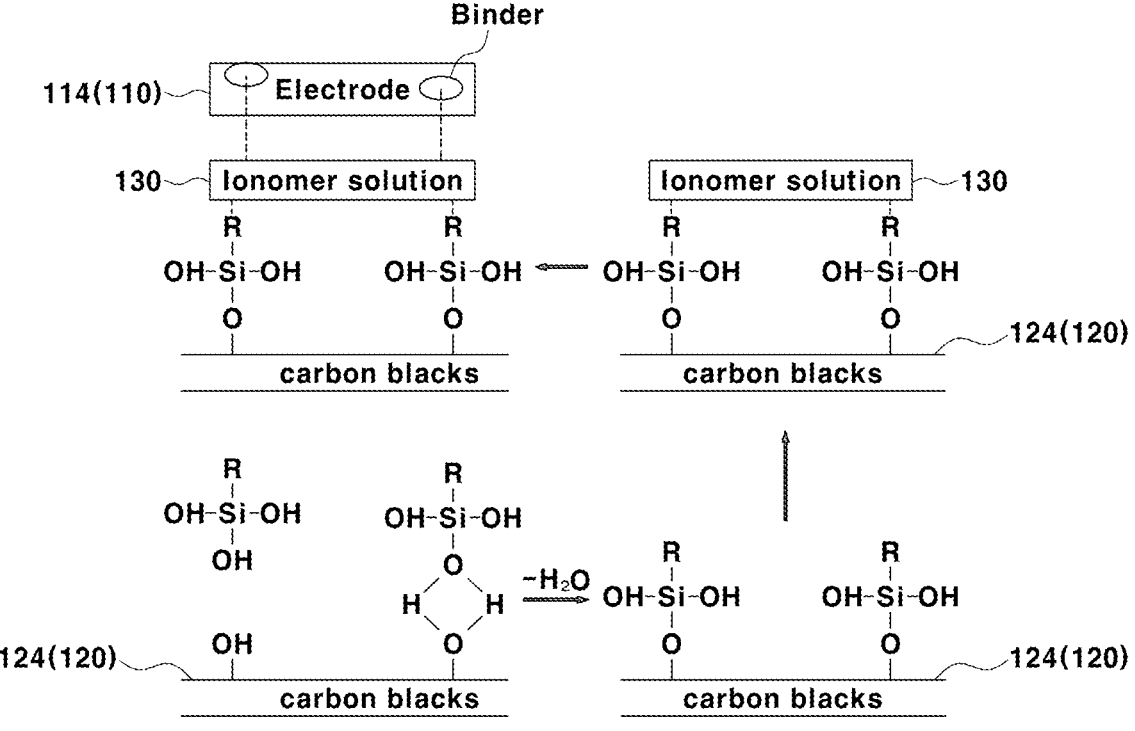
FIG. 6 is a view exemplarily illustrating an action mechanism of a coupling agent applied to the method of manufacturing an electricity generating assembly according to the other embodiment of the present disclosure.

Among the appended drawings, FIG. 1 schematically illustrates a cross-sectional structure of an electricity generating assembly produced by a method of manufacturing an electricity generating assembly according to an exemplary embodiment of the present disclosure; FIG. 2 illustrates a gas diffusion layer to which a coupling agent-friendly adhesive is applied by the method of manufacturing an electricity generating assembly according to the exemplary embodiment of the present disclosure; FIG. 3 is a view schematically illustrating an electricity generating assembly produced by a method of manufacturing an electricity generating assembly according to another exemplary embodiment of the present disclosure; and FIG. 4 is a view exemplarily illustrating a gas diffusion layer to which a coupling agent-friendly adhesive is applied by the method of manufacturing an electricity generating assembly according to the other embodiment of the present disclosure. Furthermore, FIG. 5 is a view schematically illustrating a method of manufacturing an electricity generating assembly according to another exemplary embodiment of the present disclosure, and FIG. 6 is a view exemplarily illustrating an action mechanism of a coupling agent applied to the method of manufacturing an electricity generating assembly according to the other embodiment of the present disclosure.

As illustrated in FIG. 1, an electricity generating assembly 100 produced by a method of manufacturing an electricity generating assembly according to an exemplary embodiment of the present disclosure includes a membrane electrode assembly 110, a pair of gas diffusion layers 120 disposed on both surfaces of the membrane electrode assembly 110, and adhesion layers 130 that are formed on internal surfaces of the gas diffusion layers 120 and are bonded to opposite internal surfaces of the membrane electrode assembly 110.

The membrane electrode assembly 110 is made up of an electrolyte membrane 112, and a pair of electrodes 114 stacked and disposed on both surfaces of the electrolyte membrane 112. The electrodes 114 may be bonded to the surfaces of the electrolyte membrane 112. Opposite surfaces of the membrane electrode assembly 110 are external surfaces of the electrodes 114. Internal surfaces of the electrodes 114 adjoin both surfaces of the electrolyte membrane 112.

The membrane electrode assembly 110 is provided with sub-gaskets 140 on an external wall thereof. Each of the sub-gaskets 140 is formed in a shape of a seat whose middle portion has an opening, and external surfaces of the electrodes 114 are exposed through the openings of the sub-gaskets 140. In the instant case, the external surfaces of the electrodes 114 are surfaces that are located on the sides opposite to the electrolyte membrane 112 and are not in contact with the electrolyte membrane 112. Internal surfaces of the electrodes 114 are in contact with electrolyte membrane 112 while facing the electrolyte membrane 112.

The sub-gaskets 140 are formed to surround the external wall of the membrane electrode assembly 110, protecting an external circumferential surface of the electrolyte membrane 112. To be specific, the sub-gaskets 140 may be formed to have a C-shaped sectional structure to surround both an external circumferential surface of the membrane electrode assembly 110 and a surface edge portion of the membrane electrode assembly 110. In the instant case, the surface of the membrane electrode assembly 110 includes the external surfaces of the electrodes 114. The external surfaces of the electrodes 114 face the gas diffusion layers 120.

In other words, the sub-gaskets 140 are configured to cover an external circumferential surface of the electrolyte membrane 112 and the external circumferential surfaces of the electrodes 114, and simultaneously to cover edge portions of the external surfaces of the electrodes 114. Furthermore, the external surfaces of the electrodes 114 are joined to internal surfaces of the gas diffusion layers 120 through the adhesion layers 130.

As shown in FIG. 1, the internal surfaces of the gas diffusion layers 120 are surfaces opposite to the membrane electrode assembly 110. The internal surfaces of the gas diffusion layers 120 are joined to the surface of the membrane electrode assembly 110 through the adhesion layers 130. Furthermore, the internal surfaces of the gas diffusion layers 120 may be joined to the surface of the membrane electrode assembly 110 even through the sub-gaskets 140.

The gas diffusion layers 120 may be bonded to the surfaces of the sub-gaskets 140 using an adhesive. To be specific, the adhesive may be applied to the surfaces of the gas diffusion layers 120, and the sub-gaskets 140 may be bonded to the surfaces of the gas diffusion layers 120 to which the adhesive is applied.

Each of the gas diffusion layers 120 includes a base 122 and a microporous layer (MPL) 124. Each of the bases 122 functions to determine rigidity of each of the gas diffusion layers 120 and to support each of the microporous layers 124. Each of the microporous layers 124 has a physical property that transmits a gas and moisture. The gas and moisture which are transmitted by each of the microporous layers 124 are diffused and transferred to the membrane electrode assembly 110.

Each of the microporous layers 124 is stacked and disposed on an internal surface of each of the bases 122. That is, an internal surface of each of the microporous layers 124 is bonded to the internal surface of each of the bases 122. An internal end portion of each of the sub-gaskets 140 (or a gasket wing portion) and each of the adhesion layers 130 are joined to and disposed on an external surface of each of the microporous layers 124. The external surfaces of the microporous layers 124 are joined with the membrane electrode assembly 110 through the adhesion layers 130.

Although not illustrated in the drawings, when the fuel cell is produced, the separator 200 for the fuel cell as illustrated in FIGS. 2 and 4 may be stacked and disposed on the external surface of each of the bases 122.

As illustrated in FIG. 1 and FIG. 2, the adhesion layers 130 are at least formed at the edge portions of the surfaces of the gas diffusion layers 120. In the instant case, the adhesion layers 130 are disposed to adjoin the gasket wing portions 142 of the sub-gaskets 140 joined to the surfaces of the gas diffusion layers 120. That is, the adhesion layers 130 are formed and disposed at the edge portions of the surfaces of the gas diffusion layers 120 except regions to which the gasket wing portions 142 are joined.

The membrane electrode assembly 110 is supplied with reaction gases through the separator 200 for the fuel cell. Referring to FIG. 2, the separator 200 is provided with a gas channel portion 202 to which the reaction gases flow. The adhesion layers 130 are formed at the edge portions of the surfaces of the gas diffusion layers 120 at which inlet and outlet portions of the gas channel portion 202 face each other. The reaction gases may be both hydrogen which is a fuel of the fuel cell and oxygen or air which is an oxidant of the fuel cell.

The adhesion layers 130 are disposed at the edge portion of the surface of each of the gas diffusion layers 120, and thereby the adhesion layers 130 can relieve a shock applied to the membrane electrode assembly 110 due to a hydraulic pressure of the reaction gas. That is, the adhesion layers 130 are formed at the edge portion of the surface of each of the gas diffusion layers 120, and thereby the adhesion layers 130 can reduce a shock applied to the membrane electrode assembly 110 in an environment in which an excessive flow rate of the reaction gas is generated.

Furthermore, in the case where the adhesion layers 130 are formed in part at the edge portions of the surfaces of the gas diffusion layers 120, costs may be reduced in comparison with the case where the adhesion layers 130 are formed in whole on the surfaces of the gas diffusion layers 120 (see the reference number 132 in FIG. 3 and FIG. 4).

As illustrated in FIG. 3 and FIG. 4, adhesion layers 132 may be formed in whole on the surfaces of the gas diffusion layers 120. To be specific, the adhesion layers 132 may be formed in whole on the surfaces of the gas diffusion layers 120 to which the sub-gaskets 140 are not bonded. In other words, the adhesion layers 132 may be formed in whole on the surfaces of the gas diffusion layers 120 except the regions of the gas diffusion layers 120 to which the gasket wing portions 142 are bonded.

The membrane electrode assembly 110 is provided with sub-gaskets 140 on the outskirts thereof, and the edge portions of the internal surfaces of the gas diffusion layers 120 are bonded with the gasket wing portions 142 of the sub-gaskets 140. Accordingly, when the adhesion layers 132 are formed on the surfaces of the gas diffusion layers 120, the adhesion layers 132 are formed in whole on the surfaces of the gas diffusion layers 120 to which the gasket wing portions 142 are not bonded.

The adhesion layers 130 and 132 as illustrated in FIG. 1, FIG. 2, FIG. 3, and FIG. 4 are formed in the processes of producing the electricity generating assembly 100 or 100'.

Here, the processes of producing the electricity generating assembly 100 or 100' will be described with additional reference to FIG. 5 and FIG. 6.

As illustrated in FIG. 5, a method of producing an electricity generating assembly according to an exemplary embodiment of the present disclosure includes a step S10 of applying a coupling agent to surfaces of gas diffusion layers 120, a step S12 of applying a coupling agent-friendly adhesive to the surfaces of the gas diffusion layers 120 modified by application of the coupling agent, forming adhesion layers 130 and 132, a step S14 of stacking the gas diffusion layers 120 on opposite surfaces of the membrane electrode assembly 110 respectively, and thereby causing the adhesion layers 130 and 132 to come into contact with the surfaces of the membrane electrode assembly 110.

Before the coupling agent is applied to the surfaces of the gas diffusion layers 120, the membrane electrode assembly 110 and the pair of gas diffusion layers 120 are previously produced and prepared.

The membrane electrode assembly 110 is produced to include the electrolyte membrane 112 and the pair of electrodes 114 bonded to opposite surfaces of the electrolyte membrane 112. The gas diffusion layers 120 are produced to include bases 122 and microporous layers 124 bonded to first surfaces of the bases 122.

In the step S10 of applying the coupling agent, the coupling agent is applied to each of the surfaces of the pair of gas diffusion layers 120.

As the coupling agent, a material capable of increasing an affinity between the gas diffusion layers 120 and the adhesion layers 130 and 132 is used. That is, as the coupling agent, the material capable of increasing an affinity between the microporous layer 124 of each of the gas diffusion layers 120 and the coupling agent-friendly adhesive is used. The adhesion layers 130 and 132 are formed by the coupling agent-friendly adhesive.

The coupling agent has a functional group equal to a functional group of a compound of which the microporous layer 124 is formed. The microporous layer 124 is formed of a carbon composite, and the functional group of the carbon composite is a hydroxyl group (having the chemical formula —OH) and the functional group of the coupling agent reacting with the functional group of the carbon composite. For example, the carbon composite may be a carbon black.

When the coupling agent is applied to the surface of the microporous layer 124, the functional group (i.e., the OH group) of the microporous layer 124 is modified into O—Si—R as illustrated in FIG. 6 by reacting with the functional group (i.e., the OH group) of the microporous layer 124. When the functional group of the microporous layer 124 and the functional group of the coupling agent react with each other, water ($H_2O$) is generated and separated.

To be specific, a silane based coupling agent may be used as the coupling agent. For the silane based coupling agent, 0.1 parts by weight to 1.0 parts by weight is used with respect to 100 parts by weight of an MPL slurry. This is because, when the MPL slurry is lower than 0.1 parts by weight, there is a high possibility that a silylation reaction of carbon contained in the MPL slurry with the coupling agent is not sufficiently advanced, and because, when the MPL slurry exceeds 1.0 parts by weight, unnecessary expenses caused by excessive use of the MPL slurry occurs, which is made economically unfavorable. The MPL slurry is a composition used to form the microporous layer 124.

The silane based coupling agent includes a hydrolysable silanol group (Si—OH) capable of performing a reaction with a functional group existing on the surface of the microporous layer 124. As the silanol group, a methoxy group, an ethoxy group, a dialkoxy group, a trialkoxy group, or the like may be used.

Furthermore, as illustrated in FIG. 6, the coupling agent (OH—Si—R) includes an alkyl group (—R) having affinity with the coupling agent-friendly adhesive. As the alkyl group, a vinyl group, an amino group, an epoxy group, a methacryl group, a mercapto group, or the like can be configured. For example, as the functional group of the coupling agent, 3-glycidoxypropyl trimethoxysilane, (N-2-(aminoethyl)-3-amino propyl methyldimethoxysilane, 3-ureidopropyl trialkoxysilane, vinyltrimethoxysilane, 3-acryloxyproypl trimethoxysilane, etc. may be used.

As the coupling agent-friendly adhesive, an organic compound having affinity with the functional group of the coupling agent is used. As the organic compound, a fluorine-based polymer organic compound having affinity with the alkyl group of the coupling agent and the electrode material of the membrane electrode assembly 110, and particularly ionomer may be used.

The coupling agent-friendly adhesive is applied to the surfaces of the gas diffusion layers 120 modified by the application of the coupling agent, and thereby the adhesion layers 130 and 132 are formed on the surfaces of the gas diffusion layers 120. In detail, the coupling agent-friendly adhesive is applied on the surface of the microporous layer 124, and thus forms the adhesion layers 130 and 132.

When the coupling agent is applied to the surface of the microporous layer 124, the OH group existing in the carbon composite of which the microporous layer 124 is made up and the OH group of the coupling agent (OH—Si—R) are hydrolyzed, and accordingly, like the carbon composite including O—Si—R, the carbon composite and the coupling agent react to be coupled.

The coupling agent-friendly adhesive is applied to the surfaces of the gas diffusion layers 120 to which the coupling agent is applied and coupled. In other words, the coupling agent-friendly adhesive is applied to the surface of the microporous layer 124 in which the carbon composite (O—Si—R) exists.

As the fluorine-based polymer organic compound, the coupling agent-friendly adhesive has affinity with the alkyl group (R) of the coupling agent, and thus is coupled to the surface of the microporous layer 124 through the coupling agent under a chemical reaction. In the instant case, due to the coupling agent, affinity of the coupling agent-friendly adhesive with the microporous layer 124 is improved.

Furthermore, in the instant case, the coupling agent-friendly adhesive forms the adhesion layers 130 and 132 having a given thickness on the surface of the microporous layer 124.

When the gas diffusion layers 120 having the adhesion layers 130 and 132 formed on the surface of the microporous layer 124 are stacked on the surface of the membrane electrode assembly 110, gas diffusion layers 120 and the membrane electrode assembly 110 are joined while the adhesion layers 130 and 132 comes into contact with the surface of the membrane electrode assembly 110.

The coupling agent-friendly adhesive of which the adhesion layers 130 and 132 are made up has affinity with the coupling agent and simultaneously the binder contained in the electrode material (i.e., the electrode composition) of which the electrodes 114 of the membrane electrode assembly 110 are made up. The electrode material may be a composition composed using an organic compound equal to the coupling agent-friendly adhesive or an organic compound similar to the coupling agent-friendly adhesive as a binder. For example, the binder contained in the electrode composition may be the fluorine-based polymer organic compound such as ionomer.

Thus, when the adhesion layers 130 and 132 come into contact with the surface of the membrane electrode assembly 110, an adhesive force is generated by an interaction between the binder contained in the electrodes 114 of the membrane electrode assembly 110 and the coupling agent-friendly adhesive. Due to the adhesive force, the adhesion layers 130 and 132 and the membrane electrode assembly 110 are bonded, so that the membrane electrode assembly 110 and the gas diffusion layers 120 are coupled through the adhesion layers 130 and 132.

When the coupling agent and the coupling agent-friendly adhesive are applied to the surfaces of the gas diffusion layers 120, they are at least applied to edge portions of the surfaces of the gas diffusion layers 120. In the instant case, the coupling agent and the coupling agent-friendly adhesive are applied to the surfaces of the gas diffusion layers 120 excluding the region to which the gasket wing portion 142 is bonded (see the bonding region of the gasket wing portion of FIGS. 2 and 4).

Meanwhile, the coupling agent-friendly adhesive may be applied to the surfaces of the gas diffusion layers 120 in the state of slurry or a solution. The coupling agent-friendly adhesive may be applied in a spray mode, or an injection-based application mode, in addition to a mode in which the coupling agent-friendly adhesive is directly applied to the surfaces of the gas diffusion layers 120. The gas diffusion layers 120 may be stacked and bonded to the surface of the membrane electrode assembly 110 before the coupling agent-friendly adhesive is completely cured.

Furthermore, when the gas diffusion layers 120 is stacked and bonded to the surface of the membrane electrode assembly 110, a gap (see FIG. 2) corresponding to a thickness of the gasket wing portion 142 exists between the gas diffusion layer 120 and the membrane electrode assembly 110. The sub-gaskets 140 are provided at the external portion of the membrane electrode assembly 110, and the gasket wing portions 142 stacked and disposed on the surface of the membrane electrode assembly 110 are provided at the end portions of the sub-gaskets 140.

The coupling agent-friendly adhesive is applied to the surfaces of the gas diffusion layers 120 so as either to have the same thickness as the thickness of each of the gasket wing portions 142 or to have a thickness thinner than the gasket wing portions 142.

When the coupling agent-friendly adhesive is applied to the surface of each of the gas diffusion layers 120 at a thickness thinner than the gasket wing portions 142, the adhesion layers 130 and 132 may be bonded to the surface of the membrane electrode assembly 110 by a hot press process for the gas diffusion layers 120 and the membrane electrode assembly 110.

As an exemplary embodiment of the present disclosure, when the electricity generating assembly 100 or 100' is manufactured, the gas diffusion layers 120 and the membrane electrode assembly 110 may be heated while being pressed in a direction of stacking thereof through a hot press process. As an exemplary embodiment of the present disclosure, when the electricity generating assembly 100 or 100' is manufactured, the gas diffusion layers 120 and the membrane electrode assembly 110 may be pressed in the stacking direction thereof in a process of stacking the gas diffusion layers 120 and the membrane electrode assembly 110 and then disposing the separators outside the gas diffusion layers 120. In the instant case, a contact force may be secured between the adhesion layers 130 and 132 and the membrane electrode assembly 110 while the adhesion layers 130 and 132 come into close contact with the surface of the membrane electrode assembly 110.

Furthermore, the coupling agent and the coupling agent-friendly adhesive may be applied in whole to the surfaces of the gas diffusion layers 120. In the instant case, the coupling agent-friendly adhesive is applied to the surfaces of the gas diffusion layers 120, excluding the region where the gasket wing portions 142 are bonded (see the region where the gasket wing portions are bonded in FIG. 4). The gasket wing portion bonding regions are any regions of the gas diffusion layers 120 to which the gasket wing portions 142 is bonded when the gas diffusion layers 120 are stacked on the surface of the membrane electrode assembly 110.

In the case where the coupling agent-friendly adhesive is in whole applied to the surfaces of the gas diffusion layers 120, an adhesive force between the gas diffusion layers 120 and the membrane electrode assembly 110 may be improved, in comparison with the case where the coupling agent-friendly adhesive is partly applied to the edge portions of the surfaces of the gas diffusion layers 120. In the case where the coupling agent-friendly adhesive is fully applied on the surfaces of the gas diffusion layers 120, the adhesion layers 130 and 132 formed of the coupling agent-friendly adhesive can reduce a speed of deterioration of the membrane electrode assembly 110.

While the coupling agent-friendly adhesive is not immersed in the membrane electrode assembly 110 or the gas diffusion layers 120, the adhesion layers 130 and 132 are formed between the gas diffusion layers 120 and the membrane electrode assembly 110.

The ionomer used as the coupling agent-friendly adhesive may be a perfluorosulfonic acid (PFSA) ionomer that includes fluorine in a main chain and a sulfonic acid group in a side chain.

Furthermore, the coupling agent-friendly adhesive may be composed to further include an anti-oxidant agent. In other words, as the coupling agent-friendly adhesive, a composition formed by adding the antioxidant agent to the fluorine-based polymer organic compound may be used.

When the coupling agent-friendly adhesive to which the antioxidant agent is added is applied to the surfaces of the gas diffusion layers 120, the antioxidant agent reduces a chemical degradation speed of the membrane electrode assembly 110, and thereby it is possible to increase durability of the membrane electrode assembly 110.

For example, as the antioxidant agent, metal-based chloride or metal-based chloride including cerium (Ce), platinum (Pt), carbon carried with platinum (Pt/C), etc. may be used.

Here, processes of manufacturing an electricity generating assembly according to another exemplary embodiment of the present disclosure will be described with reference to FIG. 7 attached. However, it is noted that, when the processes of manufacturing an electricity generating assembly according to another exemplary embodiment of the present disclosure is described, description of the exemplary embodiment that overlaps with the exemplary embodiment described above will be omitted.

Furthermore, the electricity generating assembly, which is manufactured through the processes of manufacturing the electricity generating assembly according to another exemplary embodiment of the present disclosure, may be configured in a same structure as the electricity generating assembly 100 illustrated in FIG. 1 or the electricity generating assembly 100' illustrated in FIG. 3.

Figure 7:
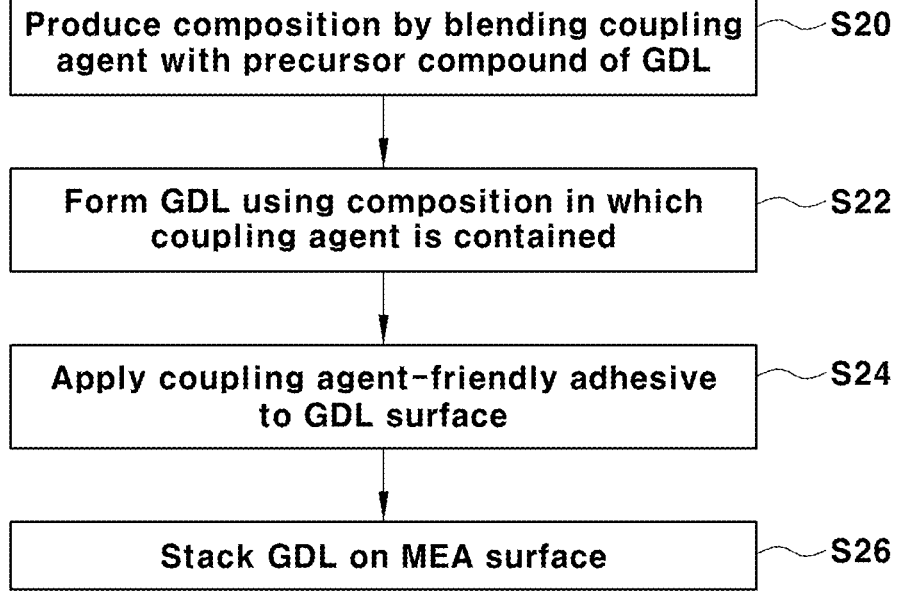
FIG. 7 is a view schematically illustrating a method of manufacturing an electricity generating assembly according to another exemplary embodiment of the present disclosure.

As illustrated in FIG. 7, the method of manufacturing the electricity generating assembly according to another exemplary embodiment of the present disclosure includes: a step S20 of blending a coupling agent (OH—Si—R) with precursor compounds of the gas diffusion layers 120 and thereby producing an MPL composition in which the coupling agent is contained; a step S22 of forming the gas diffusion layers 120 using the MPL composition in which the coupling agent is contained; a step S24 of applying a coupling agent-friendly adhesive to surfaces of the gas diffusion layers 120 and thereby forming adhesion layers 130 and 132; and a step S26 of stacking the gas diffusion layers 120 on the surfaces of the membrane electrode assembly 110 and causing the adhesion layers 130 and 132 to come into contact with the surfaces of the membrane electrode assembly 110.

The precursor compound is a compound for producing the microporous layers 124 of the gas diffusion layers 120. The precursor compound may be produced in a slurry state.

As the coupling agent, a coupling agent having, for example, the functional group as described above may be used. That is, as the coupling agent-friendly adhesive, a fluorine-based polymer organic compound, which has an alkyl group (R) of the coupling agent and an affinity with the electrode material of the electrode material of the membrane electrode assembly 110, may be used.

The MPL composition in which the coupling agent is contained is a composition produced by blending the coupling agent into the precursor compound of the microporous layer 124. That is, the MPL composition in which the coupling agent is contained is a precursor compound to which the coupling agent is added.

By adding the coupling agent when the precursor compound is composed, the MPL composition in which the coupling agent is contained may be produced. To be specific, in a step S20 of producing the MPL composition in which the coupling agent is contained, an additional blending process for a given time at a given temperature is advanced after the coupling agent is added to the precursor compound, and thereby the MPL composition in which the coupling agent is contained is produced.

For example, the additional blending process for 12 hours at 50° C. is advanced after the coupling agent is added to the precursor compound of the microporous layer 124, and thereby the MPL composition in which the coupling agent is contained may be produced.

As an exemplary embodiment of the present disclosure, after the MPL composition in which the coupling agent is contained is produced, the composition is applied to the surface of the base 122, the microporous layer 124 is formed. Accordingly, the gas diffusion layers 120 may be produced. Furthermore, as an exemplary embodiment of the present disclosure, the composition is applied onto a separate sheet, the microporous layer 124 is formed, and then the microporous layer 124 is bonded to a surface of the base 122. Accordingly, the gas diffusion layers 120 may be produced. In the instant case, the microporous layer 124 is the microporous layer 124 in which the coupling agent is contained.

When the precursor compound of the microporous layer 124 is composed, the coupling agent is added, and thereby the microporous layer 124 and the gas diffusion layers 120 may be produced without a separately added process.

After the gas diffusion layers 120 made up of the microporous layer 124 and the base 122 as describe above are produced, the coupling agent-friendly adhesive is applied to the surface of the microporous layer 124, forming the adhesion layers 130 and 132 on the surface of the microporous layer 124.

The coupling agent-friendly adhesive has an affinity with the alkyl group (R) of the coupling agent existing in the microporous layer 124, and thus the coupling agent-friendly adhesive is coupled to the surface of the microporous layer 124 by a chemical reaction. Here, the affinity between the microporous layer 124 and the coupling agent-friendly adhesive is increased by the coupling agent.

Furthermore, here, the coupling agent-friendly adhesive forms the adhesion layers 130 and 132 at a predetermined thickness on the surface of the microporous layer 124.

When the gas diffusion layers 120 each having the adhesion layers 130 and 132 formed on the surface of the microporous layer 124 are stacked on the surfaces of the membrane electrode assembly 110, the adhesion layers 130 and 132 come into contact with the surface of the membrane electrode assembly 110, and the gas diffusion layers 120 and the membrane electrode assembly 110 are coupled.

Meanwhile, a method of manufacturing an electricity generating assembly according to various exemplary embodiments of the present disclosure will be described with reference to FIG. 8. However, it is noted that, when the processes of manufacturing an electricity generating assembly according to another exemplary embodiment of the present disclosure is described, description of the exemplary embodiment that overlaps with the exemplary embodiment described above will be omitted.

Furthermore, an electricity generating assembly manufactured through the method of manufacturing an electricity generating assembly to various exemplary embodiments of the present disclosure may have the same structure as the electricity generating assembly 100 illustrated in FIG. 1 or the electricity generating assembly 100' illustrated in FIG. 3.

Figure 8:
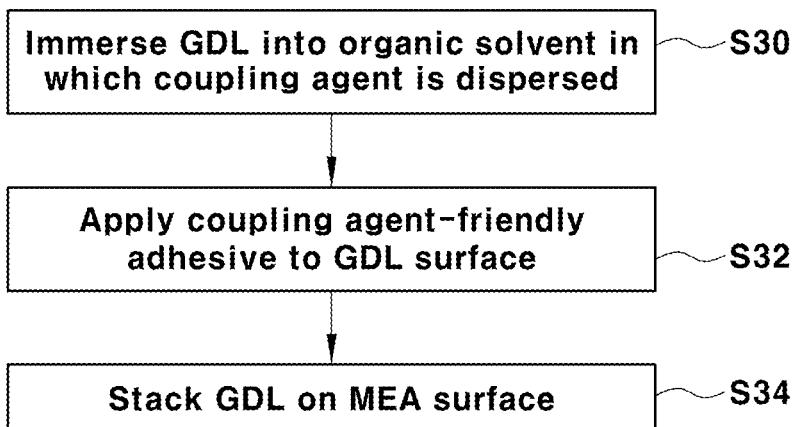
FIG. 8 is a view schematically illustrating a method of manufacturing an electricity generating assembly according to another exemplary embodiment of the present disclosure.
Figure 9:
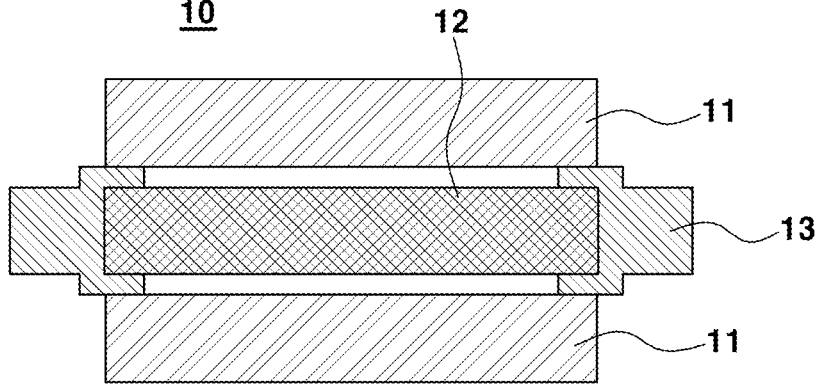
FIG. 9 is a view schematically illustrating an electricity generating assembly produced through a method of manufacturing an electricity generating assembly according to the related art.

As illustrated in FIG. 8, the method of manufacturing an electricity generating assembly to various exemplary embodiments of the present disclosure includes: step S30 of immersing gas diffusion layers 120 into an organic solvent in which a coupling agent (OH—Si—R) is dispersed; step S32 of applying the coupling agent-friendly adhesive to the surface of the gas diffusion layers 120 and thereby forming adhesion layers 130 and 132 on the surfaces of the gas diffusion layers 120; and step S34 of stacking the gas diffusion layer 120 on both surfaces of the membrane electrode assembly 110 and thereby causing the adhesion layers 130 and 132 to come into contact with the surfaces of the membrane electrode assembly 110.

As the coupling agent, a coupling agent having, for example, the functional group as described above may be used. That is, as the coupling agent-friendly adhesive, a fluorine-based polymer organic compound, which has an alkyl group (R) of the coupling agent and an affinity with the electrode material of the electrode material of the membrane electrode assembly 110, may be used.

In the step S30 of immersing the gas diffusion layers 120 into the organic solvent, at least the microporous layer 124 of the gas diffusion layers 120 is immersed into the organic solvent. The gas diffusion layers 120 include the base 122 and the microporous layer 124 stacked on the surface of the base 122. The organic solvent may be an alcohol solvent or the like.

With the microporous layer 124 being immersed into the organic solvent, heat treatment is performed at a predetermined temperature for a predetermined time period, increasing the reactivity between the microporous layer 124 and the coupling agent.

The microporous layer 124 is immersed into the organic solvent in which the coupling agent is dispersed, and thus the surface of the microporous layer 124 is modified. The microporous layer 124 is formed of a carbon composite. After the OH group existing in the carbon composite and the OH group existing in the coupling agent (OH—Si—R) are hydrolyzed, like the carbon composite including O—Si—R, the carbon composite and the coupling agent react to be coupled.

Afterwards, the gas diffusion layers 120 is heat-treated at a predetermined temperature for a predetermined time period, removing the remaining organic solvent from the gas diffusion layers 120.

For example, with the microporous layer 124 of the gas diffusion layers 120 being immersed into the organic solvent in which the coupling agent is dispersed, heat treatment is performed in an oven at 60° C. for 3 hours to increase the reactivity between the microporous layer 124 and the coupling agent, modifying the surface of the microporous layer 124. Afterwards, the gas diffusion layers 120 are further heat-treated in an oven at 80° C. to 100° C. for 3 hours, removing the remaining organic solvent from the gas diffusion layers 120.

Subsequently, the coupling agent-friendly adhesive is applied to the surface of the gas diffusion layers 120 from which the organic solvent is removed.

The coupling agent-friendly adhesive is applied to the surface of the microporous layer 124 in which the carbon composite including O—Si—R is present. The coupling agent-friendly adhesive has an affinity with the alkyl group (R) of the coupling agent, and thus is coupled to the surface of the microporous layer 124 by a chemical reaction. Here, the affinity between the microporous layer 124 and the coupling agent-friendly adhesive is increased by the coupling agent.

Furthermore, the coupling agent-friendly adhesive forms the adhesion layers 130 and 132 having a predetermined thickness on the surface of the microporous layer 124.

Afterwards, when the gas diffusion layers 120, in each of which the adhesion layers 130 and 132 are formed on the surface of the microporous layer 124, are stacked on the surfaces of the membrane electrode assembly 110, the adhesion layers 130 and 132 come into contact with the surfaces of membrane electrode assembly 110, and the gas diffusion layers 120 and the membrane electrode assembly 110 are coupled.

According to an exemplary embodiment of the present disclosure, it is possible to modify the surface of the microporous layer 124 while maintaining the mechanical properties of the gas diffusion layers 120 by use of the coupling agent on the surfaces of the sheet-shaped gas diffusion layers 120. Accordingly, the affinity between the gas diffusion layers 120 and the coupling agent-friendly adhesive may be increased.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of manufacturing an electricity generating assembly including a membrane electrode assembly and a pair of gas diffusion layers that are disposed on first and second surfaces of the membrane electrode assembly, the method comprising:

applying a coupling agent to surfaces of the gas diffusion layers to modify the surfaces of the gas diffusion layers;

applying a coupling agent-friendly adhesive to the surfaces of the gas diffusion layers to which the coupling agents are applied to form adhesion layers on the surfaces of the gas diffusion layers; and stacking the gas diffusion layers on the first and second surfaces of the membrane electrode assembly to allow the adhesion layers to come into contact with the first and second surfaces of the membrane electrode assembly, wherein the membrane electrode assembly includes an electrolyte membrane and a pair of electrodes bonded to first and second surfaces of the electrolyte membrane, and the gas diffusion layers are bonded to surfaces of the electrodes through the adhesion layers.

2. The method of claim 1, wherein each of the gas diffusion layers includes a base and a microporous layer disposed on a surface of the base, and the adhesion layers are formed on surfaces of the microporous layers of the gas diffusion layers.

3. The method of claim 2, wherein the microporous layers are formed of a carbon composite having a hydroxyl group (—OH), and the coupling agent is a silane-based coupling agent having a silanol group (—Si—OH) and an alkyl group (—R).

4. The method of claim 1, wherein the coupling agent-friendly adhesive is a fluorine-based polymer organic compound having an affinity with an alkyl group (R) of the coupling agent and an affinity with an electrode material of the membrane electrode assembly.

5. The method of claim 4, wherein the coupling agent-friendly adhesive is an ionomer.

6. The method of claim 1, wherein the coupling agent and the coupling agent-friendly adhesive are at least applied to edge portions of the surfaces of the gas diffusion layers.

7. A method of manufacturing an electricity generating assembly having a membrane electrode assembly and a pair of gas diffusion layers that are disposed on first and second surfaces of the membrane electrode assembly, the method comprising:

blending a coupling agent with precursor compounds of the gas diffusion layers to produce a composition in which the coupling agent is contained;

producing the gas diffusion layers using the composition in which the coupling agent is contained;

applying a coupling agent-friendly adhesive to surfaces of the gas diffusion layers to form adhesion layers on the surfaces of the gas diffusion layers; and stacking the gas diffusion layers on the surfaces of the membrane electrode assembly to cause the adhesion layers to come into contact with the first and second surfaces of the membrane electrode assembly.

8. The method of claim 7, wherein each of the gas diffusion layers includes a base and a microporous layer disposed on a surface of the base, and the precursor compounds are a precursor compound of the microporous layer.

9. The method of claim 8, wherein the microporous layer is formed of a carbon composite having a hydroxyl group (—OH), and the coupling agent is a silane based coupling agent having a silanol group (—Si—OH) and an alkyl group (—R).

10. The method of claim 7, wherein the membrane electrode assembly includes an electrolyte membrane and a pair of electrodes bonded to first and second surfaces of the electrolyte membrane, and the gas diffusion layers are bonded to surfaces of the electrodes through the adhesion layers.

11. The method of claim 7, wherein the coupling agent-friendly adhesive is a fluorine-based polymer organic compound having an affinity with an alkyl group (—R) of the coupling agent and an affinity with an electrode material of the membrane electrode assembly.

12. The method of claim 11, wherein the coupling agent-friendly adhesive is an ionomer.

13. A method of manufacturing an electricity generating assembly having a membrane electrode assembly and a pair of gas diffusion layers that are disposed on first and second surfaces of the membrane electrode assembly, the method comprising:

immersing the gas diffusion layers in an organic solvent in which a coupling agent is dispersed, to modify surfaces of the gas diffusion layers;

applying a coupling agent-friendly adhesive to the surfaces of the gas diffusion layers, to form adhesion layers on surfaces of the gas diffusion layers; and stacking the gas diffusion layers on the first and second surfaces of the membrane electrode assembly, to cause the adhesion layers to come into contact with the first and second surfaces of the membrane electrode assembly.

14. The method of claim 13, wherein each of the gas diffusion layers includes a base and a microporous layer disposed on a surface of the base, and the organic solvent is subjected to immersion of the microporous layer.

15. The method of claim 14, wherein the microporous layer is made up of a carbon composite having a hydroxyl group (—OH), and the coupling agent is a silane based coupling agent having a silanol group (—Si—OH) and an alkyl group (—R).

16. The method of claim 13, wherein the membrane electrode assembly includes an electrolyte membrane and a pair of electrodes bonded to first and second surfaces of the electrolyte membrane, and the gas diffusion layers are bonded to surfaces of the electrodes through the adhesion layers.

17. The method of claim 13, wherein the coupling agent-friendly adhesive is a fluorine-based polymer organic compound having an affinity with an alkyl group (—R) of the coupling agent and an affinity with an electrode material of the membrane electrode assembly.

18. The method of claim 17, wherein the coupling agent-friendly adhesive is an ionomer.

19. The method of claim 13, further including heat-treating the gas diffusion layers to remove the organic solvent which is left on the gas diffusion layers between the modification of the surfaces of the gas diffusion layer and the formation of the adhesion layers of the gas diffusion layers.

* * * * *